United States Patent Office 3,060,152
Patented Oct. 23, 1962

3,060,152
PROCESS FOR PREPARING POLYESTERS FROM AROMATIC DICARBOXYLIC ACIDS AND POLYMETHYLENE GLYCOLS IN THE PRESENCE OF CERTAIN TERTIARY AMINES
Eugene L. Ringwald, Decatur, Ala., assignor, by mesne assignments, to Monsanto Chemical Company, a corporation of Delaware
No Drawing. Filed Oct. 30, 1958, Ser. No. 770,610
10 Claims. (Cl. 260—75)

This invention relates to the manufacture of organic polyesters and is more particularly concerned with a process for producing organic polyesters which comprises reacting an aromatic dicarboxylic acid with a dihydric compound in the presence of at least one of a group of novel catalytic condensing agents and thereafter condensing the reaction product to a highly polymeric substance.

It is known to produce polymeric linear polyesters by heating together under prescribed conditions dihydric alcohols or functional derivatives thereof and dibasic carboxylic acids or polyester-forming derivatives thereof such as acid halides, salt, or simple esters of volatile alcohols. Such polyesters when highly polymerized can be formed into filaments, fibers, films, and the like that can be permanently oriented. The most widely known and most important commercially of these polymeric polyesters is polyethylene terephthalate, the production of which being disclosed in U.S. Patent No. 2,465,319. As disclosed in said patent, terephthalic acid or lower dialkyl esters thereof and ethylene glycol are condensed to form polyethylene terephthalate.

In commercial practice today, the production of polyethylene terephthalate involves the use of a two-stage reaction technique. In the first stage dimethyl terephthalate and ethylene glycol are reacted to form an intermediate product which is bis($\beta$-hydroxyethyl) terephthalate, whereby ester interchange takes place with methanol being evolved. High temperatures are necessary to effect the first stage of the reaction, and the reaction mass must be maintained at these elevated temperatures for considerable lengths of time. In the second stage the hydroxyalkyl derivative is condensed into highly polymeric polyethylene terephthalate with ethylene glycol being removed. High temperatures, as well as low pressures, are used in the second stage in order to form the polymer and to remove the ethylene glycol satisfactorily therefrom. The commercial method involves the use of dimethyl terephthalate rather than the less expensive terephthalic acid. In the ester interchange procedure prolonged periods of time are necessary to effect reaction, which are not conducive to employment of continuous production which is more desirable when operating on a commercial scale. This choice of starting material has been due to the anomalous nature of the direct reaction of terephthalic acid and ethylene glycol. Moreover, the elevolved methanol must be recovered because of economic reasons.

The direct reaction of terephthalic acid and ethylene glycol by known processes unfortunately results in the formation of undesirable polyglycol ether esters in objectionably high percents based on the weight of the resulting polymers, particularly when elevated temperatures and pressures are employed. While a prior art method discloses a way to separate the undesirable ether products, the method is wateful of time and materials and obviously could not be adapted to a commercial process.

High melting polyethylene terephthalate has been described as the product of terephthalic acid and ethylene glycol by the use of the alkali metal salts of terephthalic acid as esterification catalysts. However, the reaction is difficult to control and the removal of the alkali metal from the reaction mixture can not be easily accomplished. It is also known that reaction between the salt of a tertiary amine and terephthalic acid and excess glycol can be achieved at elevated temperatures with the elimination of the tertiary amine to produce bis($\beta$-hydroxyethyl) terephthalate or its polymer of low degree of polymerization. However, this method requires large quantities of amine to produce the amine derivative and the reaction proceeds unfavorably slow. Ordinarily, many hours are required to complete the reaction between the salt and ethylene glycol.

Therefore, there has been a real commercial need for producing a synthetic linear polyester having satisfactory physical properties directly and readily from a dibasic acid and a dihydric alcohol without the need of employing the two-stage technique that includes the ester-interchange reaction.

Accordingly, it is an object of the present invention to provide a new and improved process for producing synthetic linear condensation polyesters. It is another object of the invention to provide a new and improved process for producing polyesters which are capable of being formed into filaments, fibers, and the like, and which, when cold-drawn, show permanent orientation along the fiber axis, as revealed by characteristic X-ray patterns. It is still another object of this invention to provide a new and improved process for producing synthetic linear condensation polyesters in which there is a reduction in the time of reaction by the direct reaction of an aromatic dicarboxylic acid and certain polymethylene glycols, with the polyesters having properties at least equivalent to the polymer produced from the reaction of the diester of the corresponding aromatic dicarboxylic acid and the corresponding glycol. It is yet another object of the present invention to provide a new and improved process for the production of polyesters of the type described wherein amine catalysts in relatively small quantities are employed that enable the production of bis($\beta$-hydroxyethyl) terephthalate or its polymers of low degree of polymerization by the direct reaction of terephthalic acid and ethylene glycol with an unexpected rapidity. Other objects and advantages of the present invention will become apparent from the following detailed description.

In accordance with the present invention these objects are accomplished by forming a reaction mixture comprising an aromatic dibasic carboxylic acid, a polymethylene glycol in molar excess, and a catalytic amount of at least one volatile tertiary amine that is substantially inert in the reaction and has a basic strength of a $pK_b$ value of at most 6.0. The boiling point of the amine must be below that of the glycol employed. The reaction mixture is heated to an elevated temperature sufficient to induce vigorous ebullition of the amine and to start the reaction between the acid and glycol, with the elevated temperature being maintained until the reaction is substantially completed as indicated by the cessation of the evolution of the water of reaction, whereby bis($\beta$-hydroxyethyl) terephthalate or its polymers of low degree of polymerization is formed. During this stage of reaction the temperature must be such that the water that is formed is continuously removed by distillation as it is formed. The distillation is controlled so that the water is removed from the system and the amine that is vaporized is returned to the system in order that a substantially constant ratio in the range of at least 0.05 mol of amine per mol of dibasic carboxylic acid is present in the reaction mixture. There is no definite restriction on the upper limit in regard to the amount of amine one may use except that above a concentration of 1.0 mol of amine per mol of acid the ultimate polymer may not be as white as desired for use in producing textile products. After the evolution of water ceases, the vaporized amine is no longer returned to the system but is removed therefrom. The temperature of the reaction mixture is raised to a point above the boiling point of the polymethylene glycol in order to remove any remaining amine and excess ethylene glycol and to condense the resulting intermediate product to a highly polymerized polyester. At the more elevated temperature a reduced pressure is applied to assure removal of the remaining volatile constituents. The reaction is carried out in an inert atmosphere, such as oxygen-free nitrogen and the like.

The dicarboxylic acid employed is preferably terephthalic acid in view of its commercial availability at a relatively low cost and in view of the desirable properties of the polymer that can be produced by using this specific acid. The aromatic dicarboxylic acids which may be used in accordance with the present invention include those having the general formula:

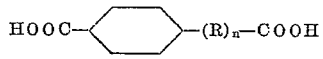

wherein $n$ is either zero or one, and R is a radical selected from the group of (a) an alkylene radical containing 1 to 8 carbon atoms;

(b)

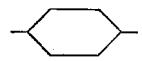

(c)

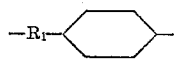

where $R_1$ is an alkylene group containing 1 to 8 carbon atoms;

(d)

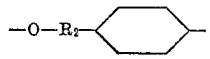

where $R_2$ is an alkylene group containing from 1 to 8 carbon atoms; and (e)

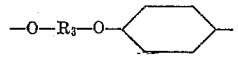

where $R_3$ is an alkylene group containing from 1 to 8 carbon atoms.

As examples of suitable aromatic p-dicarboxylic acids having the above general formulas there may be named: terephthalic acid; p,p'-dicarboxydiphenyl; p,p'-dicarboxydiphenylmethane; p,p'-dicarboxydiphenylethane; p,p'-dicarboxydiphenylpropane; p,p'-dicarboxydiphenylbutane; p,p'-dicarboxydiphenlypentane; p,p'-dicarboxydiphenylhexane; p,p'-dicarboxydiphenylheptane; p,p'-dicarboxydiphenyloctane; p,p'-dicarboxydiphenoxymethane; p,p'-dicarboxydiphenoxyethane; p,p'-dicarboxydiphenoxypropane; p,p'-dicarboxydiphenoxybutane; p,p'-dicarboxydiphenoxypentane; and p,p'-dicarboxydiphenoxyhexane.

Copolyesters can also be prepared in accordance with the present invention; for example, up to 50 weight percent of an aromatic m-dicarboxylic acid such as isophthalic acid or xylidinic acid when employed in conjunction with terephthalic acid or other aromatic p-dicarboxylic acids defined above may be employed to make a polyester having particularly desirable physical properties. Other useful aromatic dicarboxylic acids that may be used include naphthalene dicarboxylic acids such as 2,6-dicarboxy naphthalene, 3,7-dicarboxy naphthalene, and the like. It is necessary that the sole reactive groups of the acid be the two carboxyl groups. Therefore, it will be appreciated that the aromatic dicarboxylic acid may contain substituents that do not enter into the polycondensation reaction. For example, durene 1,4-dicarboxylic acid may be employed. The invention also includes processes as described above wherein polyesters can be prepared by replacing in part the aromatic dibasic carboxylic acid with up to 30 percent by weight of an aliphatic dicarboxylic acid, such as succinic acid, adipic acid, sebacic acid, α,α-dimethyl-glutaric acid, itaconic acid, β-oxydipropionic acid, α,α-oxydibutyric acid, fumaric acid, etc. Longer chain aliphatic dicarboxylic acids such as 1,20-eicosanedioic acid, 8-ethyl-1,18-octadecanedioic acid, a mixture thereof, and the like may also be substituted in part for the aromatic dicarboxylic acid.

The polymethylene glycol employed in the process of the present invention may be any glycol containing 2 to 10 carbon atoms or polyester-forming derivatives thereof, and more preferably are polymethylene glycols of the general formula, $HO(CH_2)_nOH$, wherein $n$ is an integer from 2 to 10.

The amine reactants employed herein are, preferably, the trialkylamines having at most six carbon atoms per alkyl radical, or in other words, containing from 3 to 18 carbon atoms and preferably having a $pK_b$ value of 2.5 to 5.0. Examples of such amines include trimethylamine, triethylamine, triisopropylamine, tripropylamine, tri-n-butylamine, triisobutylamine, triamylamine, triisoamylamine, trihexylamine, methyldiethylamine, dimethylamylamine, dimethylisopropylamine, dimethylhexadecylamine, and dimethylhexylamine. Also, it has been found that alicyclic or aryalkyl substituted tertiary amines such as diethylcyclohexylamine and dimethylbenzylamine, as well as saturated heterocyclic amines such as N-methyl morpholine, are suitable provided the amines have the requisite $pK_b$ values. It will be appreciated from the above examples that the alkyl radicals may be straight-chain or branched and may be of different chain lengths.

In the practice of the present invention, the calculated amounts of aromatic dicarboxylic acid, polymethylene glycol, and the defined amine catalyst are introduced together in a closeable reaction vessel provided with heating and stirring means and having openings adapted for the introduction of a gas, distillation, and the application of a vacuum. The resulting mixture is heated in an inert atmosphere, such as nitrogen, to a temperature that induces vigorous refluxing of the amine catalyst so as to facilitate the removal of the water of reaction. If desired, the reaction may be carried out at pressures at, above, or below atmospheric pressure. It is essential that the water that is evolved be continuously removed by distillation. The water and amine catalyst form an azeotropic mixture. In order to avoid the necessity of replacing the amine lost by distillation, means may be provided whereby the azeotropic mixture is condensed. The phases are then continuously separated with the amine being continuously returned to the system and the water being continuously removed therefrom. At the completion of the evolution of water, the catalyst and then the excess glycol, if any, are distilled off and then the reaction mixture subjected to a reduced pressure. This is best accomplished by maintaining a nitrogen blanket over the reactants or other inert gas containing less than 0.003 percent oxygen and a pressure within the range of less than 1 mm. to 5 mm. of mercury. This final stage of the reaction is conducted at a temperature in the range of about 220° C. to about 325° C. in order to complete the polymer formation within a reasonable time. It is important to exclude oxygen at all stages of the condensation reaction and to provide good agitation during the condensation reaction. It is usually desirable to add a polymerization catalyst at the beginning of the final step of the reaction to increase the rate of reaction. Any known catalyst may be used such as lead oxide, sodium alcoholate, lithium hydride, zinc acetate, antimony oxide, and the like. A particularly effective catalyst is zinc acetylacetonate.

Although the process may be conducted stepwise, it is particularly adaptable for use in continuous production in view of the rapidity of reaction induced by the amine catalyst. The invention therefore contemplates a continuous process for reaction of at least one polymethylene glycol as above defined with at least one aromatic dibasic carboxylic acid also as above defined to form a linear polyester having fiber-forming properties. The continuous process comprises the substantial completion of the reaction by feeding in proportion a total of from 2 to 20 mols of the glycol and one mol of said acid to a first reaction zone containing a tertiary amine catalyst described supra and continuously withdrawing the resulting reaction product from the reaction zone at the same rate that the reactants are introduced thereto. The water as it is formed during the reaction is removed and the amine is refluxed continuously so that the amount of amine is maintained at a substantially constant ratio, preferably, in the range of 0.10 to 1.0 mol per mol of acid being fed into the reaction zone. Thereafter, the withdrawn reaction product which may be bis(β-hydroxyethyl) terephthalate, lowly polymerized derivatives thereof, or mixtures of these is continuously fed into a second reaction zone maintained at approximately the same temperature as that in said first reaction zone to remove by distillation any residual amine catalyst which may be returned to the first reaction zone. Thereafter, the reaction product is directed through a third reaction zone maintained at a temperature above the boiling point of the polymethylene glycol. During this third reaction zone excess glycol is removed from the reaction product, with the glycol being recovered for use as a feed material to the first reaction zone. If desired, zones two and three may be combined providing of course that the higher temperature of the third zone is employed. By combining these steps, a mixture of amine and glycol is obtained in the distillate. Finally, the reaction product is passed through a fourth reaction zone in which the product is subjected to a high vacuum at an elevated temperature. A polymerization catalyst is preferably added at any stage before passage through the fourth reaction zone. The product that is withdrawn from said second reaction zone is a highly polymeric polyester that may be formed into filaments, films, and the like. It will be appreciated that the amine may be present in the feed materials as they are fed into the first reaction zone until the correct amount of amine builds up in said first zone. The time that the reactants spend in the reaction zones depends on the amount of amine used, the particular amine used, and other obvious process factors. Ordinarily, the overall process is completed in less than 2½ hours.

The condensation polyesters, produced in accordance with the present invention, have specific viscosities in the order of 0.3 to 0.6. This represents the fiber- and filament-forming polymers. It is to be understood, of course, that non fiber-forming polyesters may be produced by means of the present invention, which have a greater or less melt viscosity than that reiterated above. For example, polyesters which are useful in coating compositions, lacquers, and the like are within the scope of the present invention.

Specific viscosity, as employed herein, is represented by the formula:

$$N_{sp.} = \frac{\text{Time of flow of the polymer solution in seconds}}{\text{Time of flow of the solvent in seconds}} - 1$$

Viscosity determinations on the polymer solutions and solvent are made by allowing said solutions and solvent to flow by force of gravity at 25° C. through a capillary viscosity tube. All determinations of polymer solution viscosities, a polymer solution containing 0.5 percent by weight of the polymer dissolved in a solvent mixture containing two parts by weight of phenol and one part by weight of 2,4,6-trichlorophenol, and 0.5 percent by weight of water based on the total weight of the mixture, was employed.

The polyesters of this invention can be produced to form filaments and films by melt spinning methods and can be extruded or drawn in the molten state to yield products that can be subsequently cold drawn to the extent of several hundred percent of their original lengths, whereby molecularly oriented structures of high tenacity can be obtained. The condensation product can be cooled and comminuted followed by subsequent remelting and processing to form filaments, films, molded articles, and the like.

Alternatively the polyesters of this invention can be processed to shaped objects by the wet spinning method, wherein the polyesters are dissolved in a suitable solvent and the resulting solution extruded through a spinneret into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

It is particularly advantageous to incorporate in the initial reactants certain materials that form part of the molecular chain and modify the properties of the ultimate polymer, for example, in regard to dye receptivity. Such modifying materials are those aromatic compounds which in addition to possessing two functional or reactive groups such as hydroxyl, carboxyl, or esters thereof, also possess a sulfonic acid group, salts, or esters thereof, a sulfonamide group, or other sulfonic acid derivatives which under the conditions employed in dyeing polyesters with basic dyestuffs revert to sulfonic acid or a salt thereof. Compounds of this class which have been found useful in the practice of this invention are carboxyaryl, carboalkoxyaryl, arylalkanol, acyloxyalkylaryl, and aroylhalide sulfonic acids, salts thereof, sulfonamides, and the like. Useful agents of this type for employment in this invention are the sodium and potassium salts of 2,5- and 3,5-dicarbomethoxybenzene sulfonic acid. Representative agents of this type include: dicarboxyaryl compounds of the general formula:

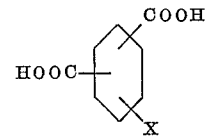

wherein X is SO₂OH, salts thereof, or SO₂NH₂, such as 3,5- and 2,5-dicarboxybenzene sulfonic acid; sodium and potassium 3,5- and 2,5-dicarboxybenzene sulfonate; dicarboxybenzene sulfonamide; dicarboxynaphthalene sulfonic acid; and the sodium and potassium salts thereof; dicarboxyaryl esters of the general formula:

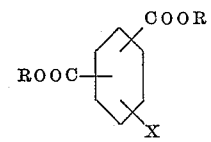

wherein R is an alkyl radical of 1 to 5 carbon atoms and X has the significance set forth above as, for example, 3,5- and 2,5-dicarbomethoxybenzene sulfonic acid; dicarboethoxybenzene sulfonic acid; dicarbopropoxybenzene sulfonic acid; dicarbobutoxybenzene sulfonic acid; and potassium and sodium salts thereof; 3,5-dicarbomethoxybenzene sulfonamide; dicarbomethoxynaphthalene sulfonic acid and sulfonamide; and the potassium and sodium salts thereof; aryl dialkanols of the general formula:

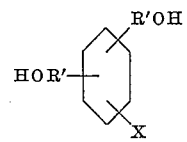

wherein R′ is a polyvalent aliphatic radical such as an alkylene radical containing 1 to 10 carbon atoms and X is as above, such as 3,5- and 2,5-di-beta hydroxyethylbenzene sulfonic acid; di-4-hydroxybutylbenzene sulfonic acid; and sodium and potassium salts thereof; dihydroxymethylbenzene sulfonamide; dihydroxymethylnaphthalene sulfonic acid and sulfonamide; and the potassium and the sodium salts thereof; esters of the aryldialkanols of the general formula:

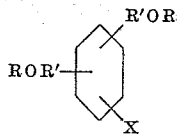

wherein R' is a divalent aliphatic radical such as an alkylene radical containing 1 to 10 carbon atoms, R is an acyl radical containing 1 to 5 carbon atoms, and X is as above, such as 3,5- and 2,5-diacetoxymethylbenzene sulfonic acid and sulfonamide; dibutoxymethylbenzene sulfonic acid; and sodium and potassium salts thereof; 3-hydroxymethyl-5-acetoxymethylbenzene sulfonic acid; and alkali metal salts thereof; compounds of the general formula which may be derived from alkylene oxides:

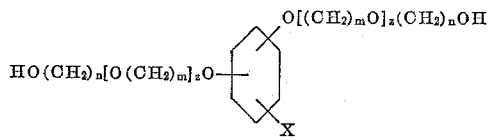

wherein $m$ and $n$ are integers from 1 to 22, $z$ is an integer from 1 to about 100 and X is as above, such as sodium di(p-omegahydroxypolyoxyethyleneoxy) benzene sulfonate of molecular weight from about 500 to 5000, preferably 1000 to 3500 and esters thereof of aliphatic monocarboxylic acids of 1 to 5 carbon atoms; compounds of the formula:

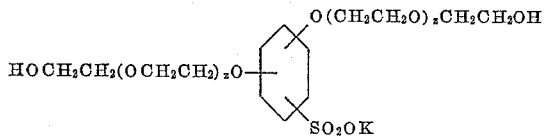

wherein $z$ is an integer from 1 to 5, and esters thereof of aliphatic monocarboxylic acids containing 1 to 5 carbon atoms; such compounds may be derived from alkylene oxides such as ethylene oxide, propylene oxide, butylene oxide, hexamethylene oxide, decamethylene oxide, and the like and from mixtures thereof; dicarbonylhalidebenzene sulfonic acids and the potassium and sodium salts thereof such as 2,5- and 3,5-dicarbonylchloridebenzene sulfonic acid; and the like. Also useful are mixtures of the above materials, as well as the materials represented by the general formulas:

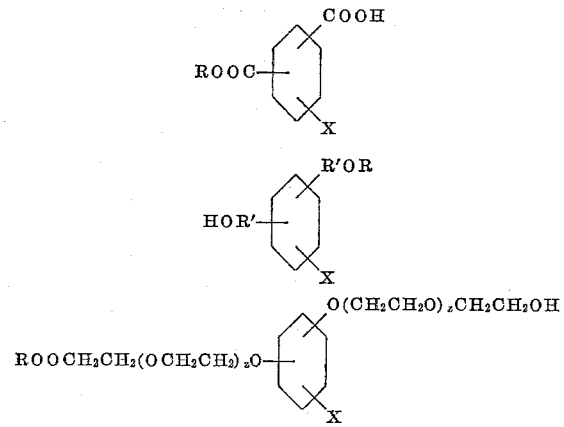

wherein $z$, R', R, and X have the significance set forth above; and the like.

Also contemplated are compounds of the general formulas:

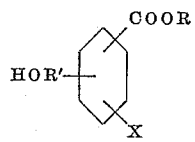

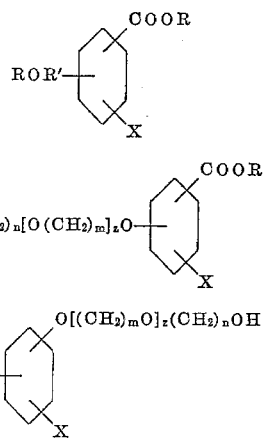

and the like wherein R, R', $m$, $n$, and $z$ have the significance set forth above.

These compounds may be represented by the general formula:

wherein A is an aromatic nucleus such as phenyl, naphthyl, and the like; Y and Z are radicals selected from the group consisting of COOH, COOR, wherein R is an alkyl radical containing 1 to 5 carbon atoms, R'OH wherein R' is a polyvalent aliphatic radical such as an alkylene radical containing 1 to 10 carbon atoms, R'OR wherein R' is a polyvalent aliphatic radical such as an alkylene radical containing 1 to 10 carbon atoms and R is an alkyl radical containing 1 to 5 carbon atoms, $O[(CH_2)_mO]_z(CH_2)_nOH$, wherein $m$ and $n$ are integers from 1 to 22, and $z$ is an integer from 1 to about 100 and esters thereof,

wherein R is an acyl radical of 1 to 5 carbon atoms and COCl, and X is a radical selected from the group consisting of $SO_2OH$, salts thereof, and $SO_2NH_2$ and are useful for modifying the polyester produced in accordance with the present invention. The salt of the sulfonic acid groups may be any metal salt or ester of an organic reagent but more preferably are the salts of an alkali metal. These difunctional agents may be employed in amounts ranging from about 0.01 mol percent to about 5.0 mol percent, based on the amount of dicarboxylic acid employed in the reaction mixture. More preferred amounts are about 0.1 to about 2.0 mol percent.

Other modifying additives include certain monohydric polyalkylene oxides and hydroxyl polyalkylvinyl ethers, preferably having a terminal hydroxy group. Suitable monohydric polyalkylene oxides are those having the general formula:

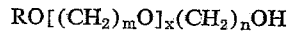

wherein R is an alkyl group containing 1 to 18 carbon atoms or an aryl group containing 6 to 10 carbon atoms, $m$ and $n$ are integers from 1 to 22, and $x$ is a whole number indicative of the degree of polymerization, that is, $x$ could be an integer from 1 to 100 or greater. As examples of substances having the above formula there may be named methoxypolyethylene glycol, methoxypolyhexamethylene glycol, methoxypolydecamethylene glycol, methoxypolyethylenebutylene glycol, ethoxypolyethylene glycol, propoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxymethylene glycol, methoxypolyethylenepropylene glycol, and the like or suitable mixtures thereof. Suitable polyalkylvinyl ethers having one terminal hydroxy group are the addition polymers usually prepared by the polymerization of alkylvinyl ethers wherein the alkyl group contains from one to four carbon atoms. Examples of such monofunctional agents are hydroxy polymethylvinyl ether; hydroxy polyethylvinyl ether; hydroxy polypropylvinyl ether; hydroxy polybutylvinyl ether; and the like. These agents or compounds may be employed in the present invention in amounts ranging from 0.1 mol percent to about 5.0 mol percent, based on the amount of dicarboxylic acid employed in the reaction mixture. More preferred are amounts of about 0.1 to 2.0 mol percent. It is understood of course that simple esters of low boiling point aliphatic monocarboxylic acids such as acetic, propionic, and the like may also be used. The weight percent of these monofunctional agents which are employed in this invention will vary with the molecular weight of the agent. The range of average molecular weights of these monohydric agents suitable for use in this invention is from about 500 to 5000, with those agents having a molecular weight in the range of about 1000 to 3500 being preferred.

Additional additives that may be employed to modify the polyesters produced in accordance with the method of this invention are the polyols which have a functionality greater than two, that is, they contain more than two functional groups as hydroxy or esters thereof such as in pentaerythritol.. Examples of other suitable compounds are compounds having the general formula:

$$R(OH)_n$$

wherein R is a polyvalent aliphatic radical such as an alkyl group containing from 3 to 6 carbon atoms and $n$ is an integer from 3 to 6, for example, glycerol, sorbitol, and the like; compounds having the general formula:

$$R(CH_2OH)_3$$

wherein R is a polyvalent aliphatic radical such as an alkyl group containing from 2 to 6 carbon atoms, for example, trimethylol ethane, trimethylol propane, and like compounds up to hexane; and compounds having the formula:

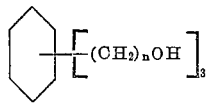

wherein $n$ is an integer from 1 to 6, including compounds of the above formula such as trimethylol benzene-1,3,5, tripropylol benzene-1,2,6, and the like. All of the above polyols may also be used in the form of simple esters of low boiling aliphatic monocarboxylic acids containing preferably 5 or less carbon atoms such as acetic, preferably, propionic, and the like.

Aromatic polyfunctional acid esters may also be profitably employed in this invention in place of or in addition to the polyols, particularly those having the formula:

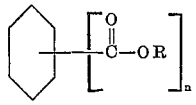

wherein $n$ may be from three to five carboalkoxy such as methoxy groups, attached to the carbon atoms of the ring which may be any aryl compound, and the alkoxy groups preferably contain hydrocarbon radicals containing 1 to 5 carbon atoms. As examples of compounds having the above formula there may be named trimethyl trimesate, triethyl trimesate, and tripropyl trimesate, tetramethyl pyromellitate, tetramethyl mellophanate, trimethyl hemimellitate, trimethyl trimellitate, tetramethyl prehnitate, and the like. In addition, there may be employed mixtures of the above esters and esters of mixtures of alcohols. Also, in most in instances, when preparing any of the compounds having the above formula, other related compounds having the same formula may be present in small amounts as impurities. This does not prevent use of the reaction product as a chain branching agent in the practice of the present invention.

These polyols and esters may be employed in the present invention in amounts ranging from 0.01 mol percent to about 2.4 mol percent, based on the amount of dicarboxylic acid employed in the reaction mixture. The preferred range of these agents for use in the present invention is from 0.1 to about 1.0 mol percent. Mixtures of the polyols and esters have been found to be valuable. The trimethyl trimesate, pentaerythritol, and sorbitol are preferred agents and normally are employed in amounts from about 0.1 to 0.7 mol percent based on the mols of terephthalic acid polymerized.

A $pK_b$ value as used hereinabove is defined as the negative logarithm of the ionization constant for a given base.

Further details of the present invention are set forth in the following examples, that are intended merely to be illustrative and not limitative. Unless otherwise indicated, all parts and percentages are by weight.

*Example I*

A reaction mixture composed of 158 gms. of terephthalic acid, 223 gms. of ethylene glycol, and 36 gms. of triethylamine, which has a $pK_b$ value of 3.25, was placed in a vessel provided with stirring means, means for the introduction of an inert gas, and means to conduct distillation either under reflux or take-off conditions at atmospheric pressure as well as under vacuum. After the vessel had been charged with the reactants, it was equipped for operation at reflux using a Dean-Starke type of moisture separation device. The reaction mixture was stirred and a slow stream of nitrogen was introduced above the surface of the reaction mixture. Then heat was applied to bring about vigorous boiling of the triethylamine and its water azeotrope. The vapors were condensed, with the water being separated from the triethylamine in the Dean-Starke moisture separator. After one hour it was noted that the reaction mixture was a clear solution. The reaction mixture was heated under reflux with separation of water for an additional 30 minutes after which the apparatus was rearranged for total distillation and the triethylamine and excess ethylene glycol were removed by distillation thereof at atmospheric pressure. When the distillation of the ethylene glycol nearly ceased, 90 mgs. of zinc acetylacetonate was added to the reaction mixture, whereupon the pressure was reduced to 0.1 mm. The reaction mixture was then heated with stirring at this pressure for an additional 70 minutes to complete the condensation reaction. The pressure was raised to atmospheric pressure with nitrogen, and the polymer was allowed to cool to a solid, crystalline block. The polymer thus attained had a specific viscosity of 0.371 and was extremely white in appearance, having a purity index of 97.0 and a brightness of 88.7 as measured spectrophotometrically against a magnesium oxide standard. The melting point of the polymer was 258–9° C.

The high polymer obtained from the terephthalic acid and ethylene glycol according to this example was spun into a lustrous filament by extruding under pressure the polymer in a molten condition through a small orifice in a spinneret. The extruded filament was wound up on a suitable take-up device and afterwards cold-drawn in excess of 100 percent. The resulting fiber possessed excellent physical properties, particularly in regard to strength and elongation.

For comparison purposes, 300 gms. of terephthalic acid and 550 gms. of ethylene glycol were mixed together and heated in an atmosphere of nitrogen at a temperature of 200–210° C. and under atmospheric pressure. After 48 hours it was found that the acid had not completely dissolved in the ethylene glycol. This indicates that the reaction between terephthalic acid and ethylene glycol under these conditions was unsatisfactorily slow.

*Example II*

Using the procedure outlined in and the apparatus used in Example I, a mixture of 158 gms. of terephthalic acid, 200 ml. of ethylene glycol, and 90 ml. of tri-n-butylamine was charged in the reaction vessel. The process was then carried out exactly as described in Example I in regard to time and reaction conditions. A crystalline polymer having a specific viscosity of 0.432 was obtained. Filaments formed from an amount of the thus-obtained polymer was capable of being cold-drawn.

*Example III*

A mixture of 142 gms. of terephthalic acid, 16 gms. of isophthalic acid, 200 ml. of ethylene glycol, and 50 ml. of triethylamine was stirred together and heated as in Example I. Complete solution occurred in one hour. This solution was then heated an additional 30 minutes with nitrogen introduction. Prior to completion of the reaction, the reactants were subjected at this elevated temperature to reduced pressure of 0.1 mm. of mercury in order to remove any volatile components from the reaction mixture. The copolyester thus formed had a specific viscosity of 0.473 and yielded filaments on drawing at normal temperatures.

*Example IV*

The apparatus described in Example I was charged with 158 gms. of terephthalic acid, 200 ml. of ethylene glycol, and 65 ml. of N,N-dimethylbenzylamine, which has a $pK_b$ value of 5.07. The process was carried out exactly as described in Example I. A crystalline polymer having a specific viscosity of 0.339 was obtained and filaments from the melt of this polymer were capable of being cold-drawn.

*Example V*

The apparatus described in Example I was charged with a mixture composed of 45 gms. of 2,6-naphthalene dicarboxylic acid, 75 ml. of ethylene glycol, and 50 ml. of triethylamine. Subsequent processing was exactly as described in Example I except that 30 mgs. of zinc acetylacetonate was added to the reaction mixture and the reaction time under vacuum was 33 minutes. The specific viscosity of the polymer obtained was 0.347 and filaments formed from the melt thereof were capable of being cold-drawn.

*Example VI*

The apparatus described in Example I was charged with 50 gms. of terephthalic acid, 100 gms. of 1,5-pentanediol, and 35 ml. of triethylamine. The process was carried out exactly as described in Example I except that 40 mgs. of zinc acetylacetonate was used. The polymer obtained upon cooling was amorphous and upon standing at room temperature for several hours became crystalline in structure. The resulting polyethylene terephthalate had a specific viscosity of 0.277 and the melt thereof was capable of being cold-drawn into filaments.

*Example VII*

The apparatus as described in Example I was charged with 158 gms. of terephthalic acid, 200 ml. of ethylene glycol, and 250 ml. of N-methylmorpholine. The process was exactly as described in Example I except that the water was removed from the refluxing N-methylmorpholine by using potassium hydroxide rather than by using the Dean-Starke separator. Filaments formed from the melt of the thus-obtained polyethylene terrephthalate were capable of being cold-drawn.

*Example VIII*

The apparatus as described in Example I was charged with 116 gms. of terephthalic acid, 150 ml. of ethylene glycol, and 110 ml. of pyridine, which has a $pK_b$ value of 8.85. The reaction mixture was heated with stirring under nitrogen to obtain vigorous refluxing of the pyridine. From time to time portions of the refluxing pyridine were removed in order to remove any water formed and like amounts of fresh pyridine were added to the system. However, even after 10 hours solution of the reactants had not been obtained. In fact, there was little evidence to indicate that reaction had occurred to any great extent in view of the large amount of unreacted terephthalic acid remaining.

It is seen from this example that unsatisfactory results are obtained when the amine is not sufficiently basic, i.e., has a $pK_b$ value greater than 6.

In place of the glycols above used in the examples other dihydric alcohols may be used with like success, such as 1,3-propanediol, 1,6-hexanediol, 1,7-heptanediol, 1,8-octanediol, 1,9-nonanediol, and 1,10-decanediol. Similarly, in place of terephthalic acid other aromatic dicarboxylic acids may be used, such as p,p'-dicarboxydiphenyl, p,p'-dicarboxydiphenyl methane, and the like.

Not only is the instant invention advantageous from the standpoint of shorter time of reaction but the same is simpler in operation and more economical than prior art methods. Moreover, in accordance with the present invention it is possible to prepare polyethylene terephthalate suitable for processing into commercially useful fibers, films, and the like by the direct reaction of low cost aromatic dicarboxylic acid and a polymethylene glycol, thereby eliminating the need of first producing a more expensive derivative of the acid.

Numerous other advantages of the present invention may be apparent to those skilled in the art. It is to be understood that changes and variations may be made without departing from the spirit and scope of the invention as defined in the appended claims.

What is claimed is:

1. A process for the production of synthetic, highly polymeric polyesters which comprises the steps of forming a reaction mixture of: (I) at least one aromatic dicarboxylic acid selected from the group consisting of (1) an acid having the formula

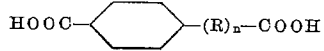

wherein $n$ is 0 to 1, and R is a radical selected from the group of (*a*) an alkylene radical containing 1 to 8 carbon atoms;

(*b*)

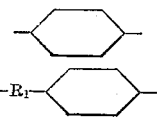

(*c*)

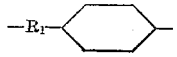

where $R_1$ is an alkylene group containing 1 to 8 carbon atoms;

(*d*)

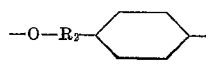

where $R_2$ is an alkylene group containing from 1 to 8 carbon atoms; and (*e*)

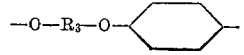

where $R_3$ is an alkylene group containing 1 to 8 carbon atoms; (2) naphthalene dicarboxylic acid; and (3) a mixture of acids composed of an acid selected from (1) and (2) and at most 50 weight percent of a mono-aromatic m-dicarboxylic acid; (II) at least one polymethylene glycol having the formula, $HO(CH_2)_nOH$, wherein $n$ is an integer from 2 to 10 in an amount of 2 to 20 mols per mol of acid; and (III) at least one volatile tertiary amine having a $pK_b$ value of 2.5 to 5.0 in an amount of 0.10 to 1.0 mol per mol of acid, the boiling point of said tertiary amine being below that of the said glycol, heating said reaction mixture to an elevated temperature sufficient to induce vigorous ebullition of the amine and to induce the reaction between said acid and said glycol, maintaining said amount of said amine in the reaction mixture at the elevated temperature until the reaction is substantially completed, continuously removing the water by distillation as it is formed during the reaction, then raising the temperature of the reaction mixture in a range above the boiling point of said glycol to remove said tertiary amine and excess glycol in the reaction mixture, and maintaining the reaction mixture at an elevated temperature and under a reduced pressure until a highly polymeric product is formed.

2. The process of claim 1 wherein the amine is tri-n-butylamine.

3. The process of claim 1 wherein the amine is N,N-dimethylbenzylamine.

4. The process of claim 1 wherein the amine is N-methylmorpholine.

5. The process of claim 1 wherein (I) is terephthalic acid.

6. The process of claim 1 wherein (I) is a mixture of terephthalic acid and isophthalic acid, the terephthalic acid comprising at least 50 percent of the mixture of acids.

7. The process of claim 5 wherein the glycol is ethylene glycol.

8. The process of claim 7 wherein the amine is triethylamine.

9. A process for the production of synthetic, highly polymeric polyesters which comprises the steps of forming a reaction mixture of: (I) at least one aromatic dicarboxylic acid selected from the group consisting of (1) an acid having the formula

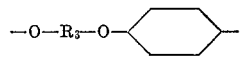

wherein $n$ is 0 to 1, and R is a radical selected from the group of (a) an alkylene radical containing 1 to 8 carbon atoms;

(b)

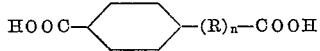

(c)

where $R_1$ is an alkylene group containing 1 to 8 carbon atoms;

(d)

where $R_2$ is an alkylene group containing from 1 to 8 carbon atoms; and (e)

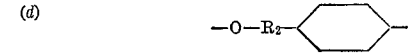

where $R_3$ is an alkylene group containing 1 to 8 carbon atoms; (2) naphthalene dicarboxylic acid; and (3) a mixture of acids composed of an acid selected from (1) and (2) and at most 50 weight percent of a mono-aromatic m-dicarboxylic acid; (II) at least one polymethylene glycol having the formula $HO(CH_2)_nOH$, wherein $n$ is an integer from 2 to 10 in an amount of 2 to 20 mols per mol of acid; (III) at least one trialkylamine having at most six carbon atoms per alkyl radical and a $pK_b$ value of 2.5 to 5.0 in an amount of 0.10 to 1.0 mol per mol of acid, the boiling point of said tertiary amine being below that of the said glycol; and (IV) a small amount of at least one additive that modifies the ultimate polymer, heating said reaction mixture to an elevated temperature sufficient to induce vigorous ebullition of the amine and to induce the reaction between said acid and said glycol, maintaining said amount of said amine in the reaction mixture at the elevated temperature until the reaction is substantially completed, continuously removing the water by distillation as it is formed during the reaction, then raising the temperature of the reaction mixture in a range above the boiling point of said glycol to remove said tertiary amine and excess glycol in the reaction mixture, and maintaining the reaction mixture at an elevated temperature and under a reduced pressure until a highly polymeric product is formed.

10. The process as defined in claim 9 wherein the steps are carried out in a continuous fashion.

References Cited in the file of this patent
UNITED STATES PATENTS

| | | |
|---|---|---|
| 2,614,120 | Caldwell | Oct. 14, 1952 |
| 2,779,783 | Hayes | Jan. 29, 1957 |
| 2,970,986 | Woodward | Feb. 7, 1961 |